(12) United States Patent
Lin

(10) Patent No.: US 8,217,550 B2
(45) Date of Patent: Jul. 10, 2012

(54) ALTERNATOR AND METHOD OF MANUFACTURING A ROTOR CORE THEREOF

(75) Inventor: Cheng-Feng Lin, Taipei (TW)

(73) Assignee: Unipoint Electric Mfg. Co. Ltd., Taipei (TW)

( * ) Notice: Subject to any disclaimer, the term of this patent is extended or adjusted under 35 U.S.C. 154(b) by 390 days.

(21) Appl. No.: 12/630,149

(22) Filed: Dec. 3, 2009

(65) Prior Publication Data

US 2011/0133595 A1 Jun. 9, 2011

(51) Int. Cl.
*H02K 1/22* (2006.01)
(52) U.S. Cl. ............... 310/263; 310/44; 310/216.006
(58) Field of Classification Search .............. 310/263, 310/216.006, 216.007, 44, 156.43; 148/225
See application file for complete search history.

(56) References Cited

U.S. PATENT DOCUMENTS

| | | | | |
|---|---|---|---|---|
| 4,087,736 A * | 5/1978 | Mori et al. | ............. | 322/28 |
| 4,377,762 A * | 3/1983 | Tatsumi et al. | ............. | 310/263 |
| 2006/0279165 A1 * | 12/2006 | Fulton et al. | ............. | 310/263 |
| 2010/0013351 A1 * | 1/2010 | Gas et al. | ............. | 310/263 |
| 2011/0133595 A1 * | 6/2011 | Lin | ............. | 310/263 |

* cited by examiner

*Primary Examiner* — Dang Le
(74) *Attorney, Agent, or Firm* — WPAT, P.C.; Anthony King

(57) ABSTRACT

An alternator includes a stator assembly and a rotor assembly. The rotor assembly includes a rotor core having a first core portion and a second core portion. The rotor core is processed by cementation, so that the first core portion has carbon content that gradually decreases from the outer surface toward the central line of the rotor core till reaching a predetermined carbon content. The second core portion has carbon content lower than that of the first core portion. With these arrangements, the alternator can reduce turn-on speed and increase outputs. A method of manufacturing the non-homogenous rotor core of the alternator is also provided.

12 Claims, 7 Drawing Sheets

ALTERNATOR AND METHOD OF MANUFACTURING A ROTOR CORE THEREOF

FIELD OF THE INVENTION

The present invention relates to an alternator with a non-homogenous rotor core and a method of manufacturing a non-homogenous rotor core thereof; and particularly refers to the characteristics about maintaining output efficiency and reducing turn-on speed.

BACKGROUND OF THE INVENTION

An alternator is a power generator that generates alternating current (AC) power through an electromagnetic induction occurred between an armature and a stator. The alternator usually applies to a car and is started by an internal combustion engine via belts and belt wheels, so as to supply electric power for electronic devices in the car. When the car is started, the alternator and a motor of the car are started by using the residual electric power from a car battery. When the motor is started, it triggers the alternator to operate and then the alternator begins to charge the car battery. Typically, the alternator includes a rotor assembly, a stator assembly, a rectifier, and a field diode.

The rotor assembly is rotatable with respect to the stator assembly, and includes a rotor core, a rotor winding, a rotor shaft, and a bearing. When an electric current flows through the rotor winding, the rotor winding is magnetized due to an electromagnetic induction to produce a magnetic field thereby. When the rotor assembly rotates, the magnetic field direction is changed accordingly.

The stator assembly encompasses the rotor assembly and consists of a stator core and one or more sets of stator windings. According to electromagnetic induction, the stator windings physically offset so that the rotating magnetic field produces currents.

The rectifier is electrically connected to the stator windings for converting the alternating current generated by the stator windings into direct current, and the direct current is used to charge batteries.

The direct current converted from the alternating current and generated by the stator windings is outputted by the field diode. Therefore, the alternator with the above structure can supply current to the stator windings by itself. This process is referred to as self excitation.

When the rotor assembly is turned on from a resting state, most of the alternators have to use the residual magnetism in the rotor core to build up a magnetic field, so that the alternator can generate sufficient power to produce the self excitation state thereof. The lowest rotating speed of the rotor assembly for producing the self excitation state of the alternator is referred to as the turn-on speed. Before reaching the turn-on speed, the alternator has to use the electric energy supplied from the battery to drive the rotor assembly to rotate, so as to perform the turn-on procedure.

Some large vehicles, such as agricultural vehicles and trolley trucks, are usually designed for specific purposes and are therefore not put into use so frequently. As it is known, a car battery is subject to self-discharge and the electric energy stored therein will gradually decrease. When the large vehicles mentioned above have not been started over a long time, the car batteries thereof tend to have insufficient battery power for driving the rotor assembly of the alternator to the required turn-on speed, making it difficult or unable to start the large vehicles.

On the other hand, some small vehicles, such as private cars and commercial vehicles for commuting or for other business purposes, are frequently started and accordingly, less suffer from the problem of insufficient battery to start the vehicles. However, the alternators for these cars and vehicles usually require a relatively high turn-on speed, which would consume more battery power.

In the alternator, the rotor core thereof is mainly used to transfer magnetic flux between the rotor assembly and the stator assembly to form a magnetic circuit, and must have the property of a permanent magnet to provide residual magnetism for generating electric power until the alternator reaches the state of self-excitation to keep the rotor assembly rotate continuously. With higher residual magnetism, the rotor can have lower turn-on speed.

The rotor core is usually made of carbon steel. The carbon steel can be categorized according to the carbon content thereof into low carbon steel, medium carbon steel and high carbon steel. The low carbon steel usually has relatively good ability of magnetic flux transfer and therefore increases the output of the alternator, such as output current or output voltage. However, the low carbon steel disadvantageously has relatively low residual magnetism when the external magnetic field is removed after magnetization. On the other hand, the high carbon steel has characteristics very close to those of the permanent magnet and has residual magnetism higher than the low carbon steel, but the high carbon steel has relatively low magnetic permeability. Thus, the prior art rotor core for an alternator is usually made of the medium carbon steel in order to maintain proper turn-on speed and output characteristics.

However, the rotor core made of the medium carbon steel has relatively high magnetomotive force drop (MMF drop) across the cross-section area of the rotor core. That is, the magnetic permeability is lowered to result in inferior output characteristics of the alternator. Moreover, the rotor core made of the medium carbon steel has a relatively low magnetic saturation flux density and, accordingly, relatively high weight, volume and mass moment of inertia, which could not be reduced further.

It is therefore desirable to develop an alternator that has reduced turn-on speed, high-output characteristics, and small volume without occupying too much space.

SUMMARY OF THE INVENTION

The object of the present invention is to provide an alternator to overcome the existing problem of poor output characteristics alternators.

According to the present invention, the object is to provide a non-homogenous rotor core for an alternator, so that the alternator with the non-homogenous rotor core of the present invention can reduce turn-on speed and enhance output characteristics.

To achieve the aforementioned object, the alternator according to a first embodiment of the present invention comprises a stator assembly and a rotor assembly. The rotor assembly comprises a rotor core, which is processed by cementation from the outer surface thereof into the central line thereof till a predetermined depth, so that a first core portion and a second core portion are formed on the rotor core. The first core portion is located at the outer side of the rotor core and has carbon content that gradually decreases in percentage from the surface of the first core portion toward the central line of the rotor core till reaching a predetermined carbon weight percentage. The second core portion is located between the inner side of the rotor core and the first core portion and contains carbon content closed to the predetermined content.

In the first embodiment of the present invention, the carbon content at the surface of the first core portion is ranging from 0.5% to 1%.

In the first embodiment of the present invention, carbon content of the first core portion decreases from the surface thereof toward the central line of the rotor core till reaching the predetermined carbon weight percentage that is ranging from 0.3% to 0.4%.

In the first embodiment of the present invention, the carbon content of the second core portion is 1.1 to 0.9 times of the predetermined carbon weight percentage In the first embodiment of the present invention, the second core portion has hardness smaller than that of the first core portion.

To achieve the mentioned object, the alternator according to a second embodiment of the present invention comprises a stator assembly and a rotor assembly. The rotor assembly comprises a rotor core, which has a first core portion and a second core portion. The first core portion is located at the inner side of the rotor core and has carbon content that gradually decreases from the surface of the first core portion toward the direction of the central line of the rotor core till reaching a predetermined carbon content. The second core portion encompasses the first core portion and contains carbon content closed to the predetermined carbon weight percentage.

In the second embodiment of the present invention, the carbon content at the surface of the first core portion is ranging from 0.5% to 1%.

In the second embodiment of the present invention, the carbon content of the first core portion decreases from the surface thereof toward the central line of the rotor core till reach the predetermined carbon weight percentage, which is ranging from 0.3% to 0.4%.

In the second embodiment of the present invention, the carbon content of the second core portion is 1.1 to 0.9 times of the predetermined carbon weight percentage.

In the second embodiment of the present invention, the first core portion has hardness value smaller than that of the second core portion.

To achieve the aforementioned object, the method of manufacturing a non-homogenous rotor core of alternator according to the present invention includes the steps of (1) providing a rotor core made of carbon steel; and (2) processing the rotor core by cementation from the outer surface thereof, allowing the rotor core to have non-homogenous carbon content, so that a first core portion is formed between the outer surface of the rotor core and the internal position with a predetermined carbon weight percentage, also a second core portion is formed between the inner surface of the rotor core and the internal position with the predetermined carbon weight percentage. Moreover, the first core portion has carbon content that gradually decreases in percentage from the surface of the first core portion toward the central line of the rotor core till reaching the predetermined carbon weight percentage.

With the alternator and the method of manufacturing a non-homogenous rotor core of an alternator according to the present invention, the carbon weight percentage of the first core portion gradually decreases from the surface of the first core portion toward the central line of the rotor core till reaching the predetermined carbon weight percentage, allowing the alternator to have reduced turn-on speed and increased outputs.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
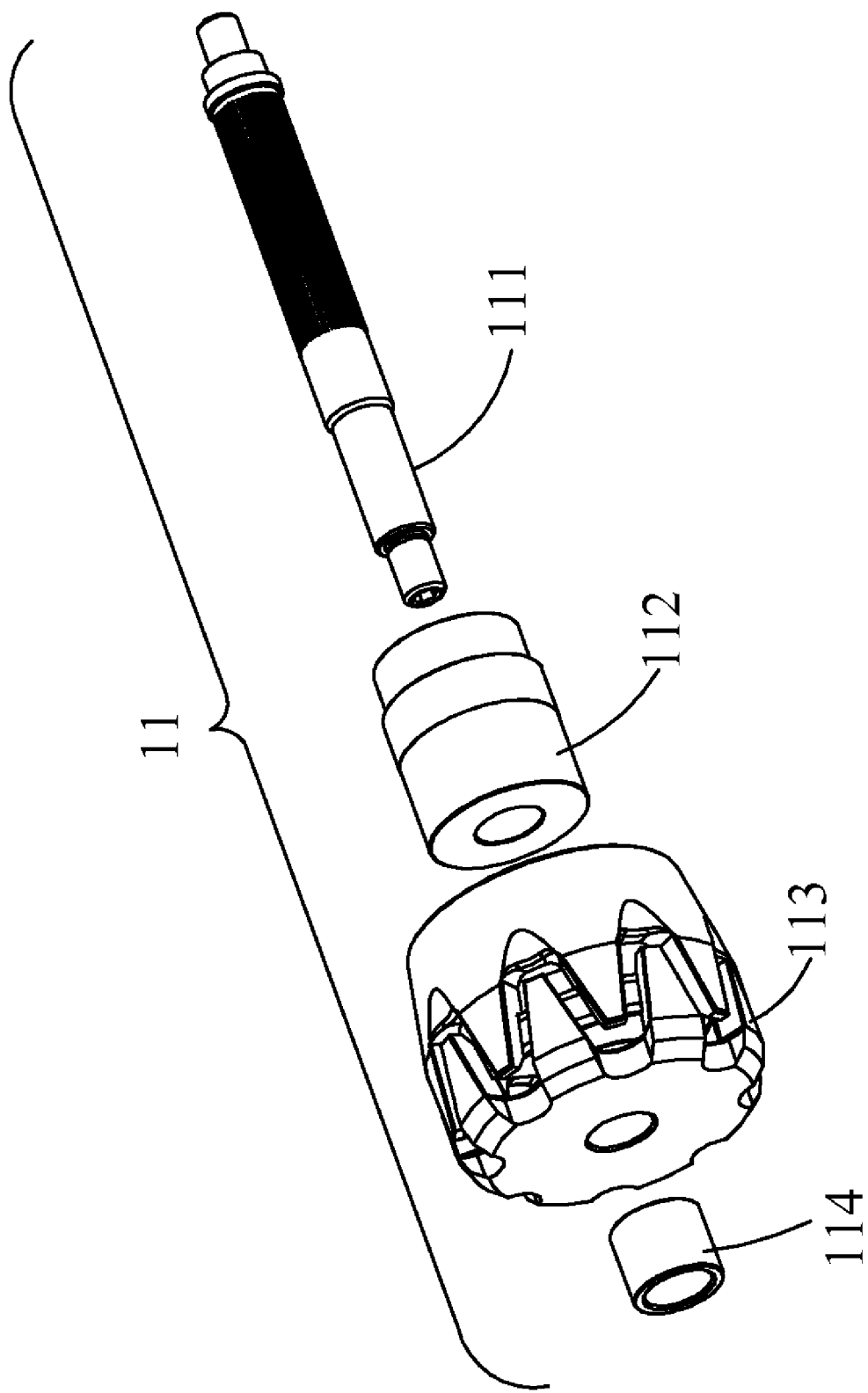
FIG. 1 is an exploded perspective view of an alternator of the present invention.
Figure 2:
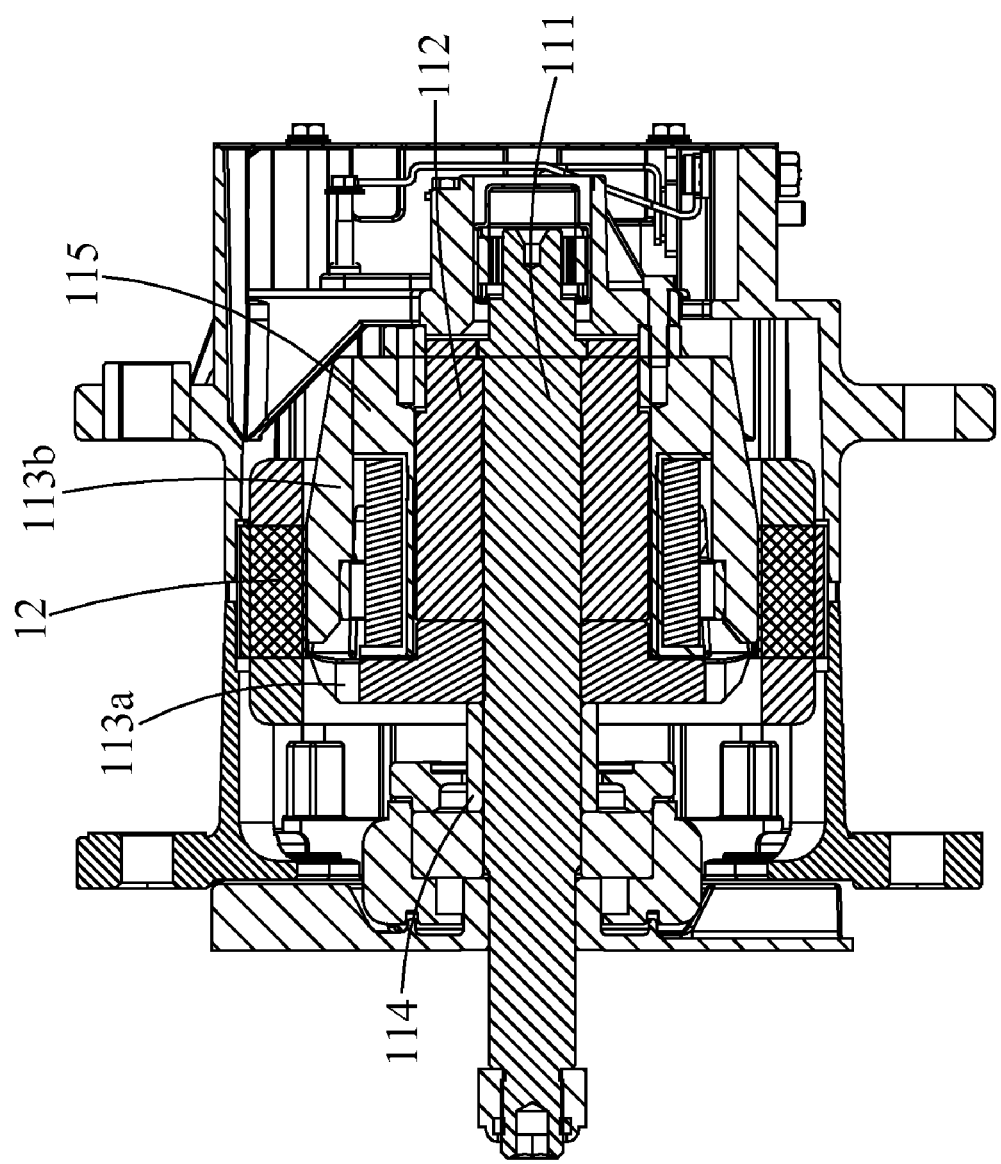
FIG. 2 is an assembled longitudinal sectional view of the alternator of the present invention.
Figure 3:
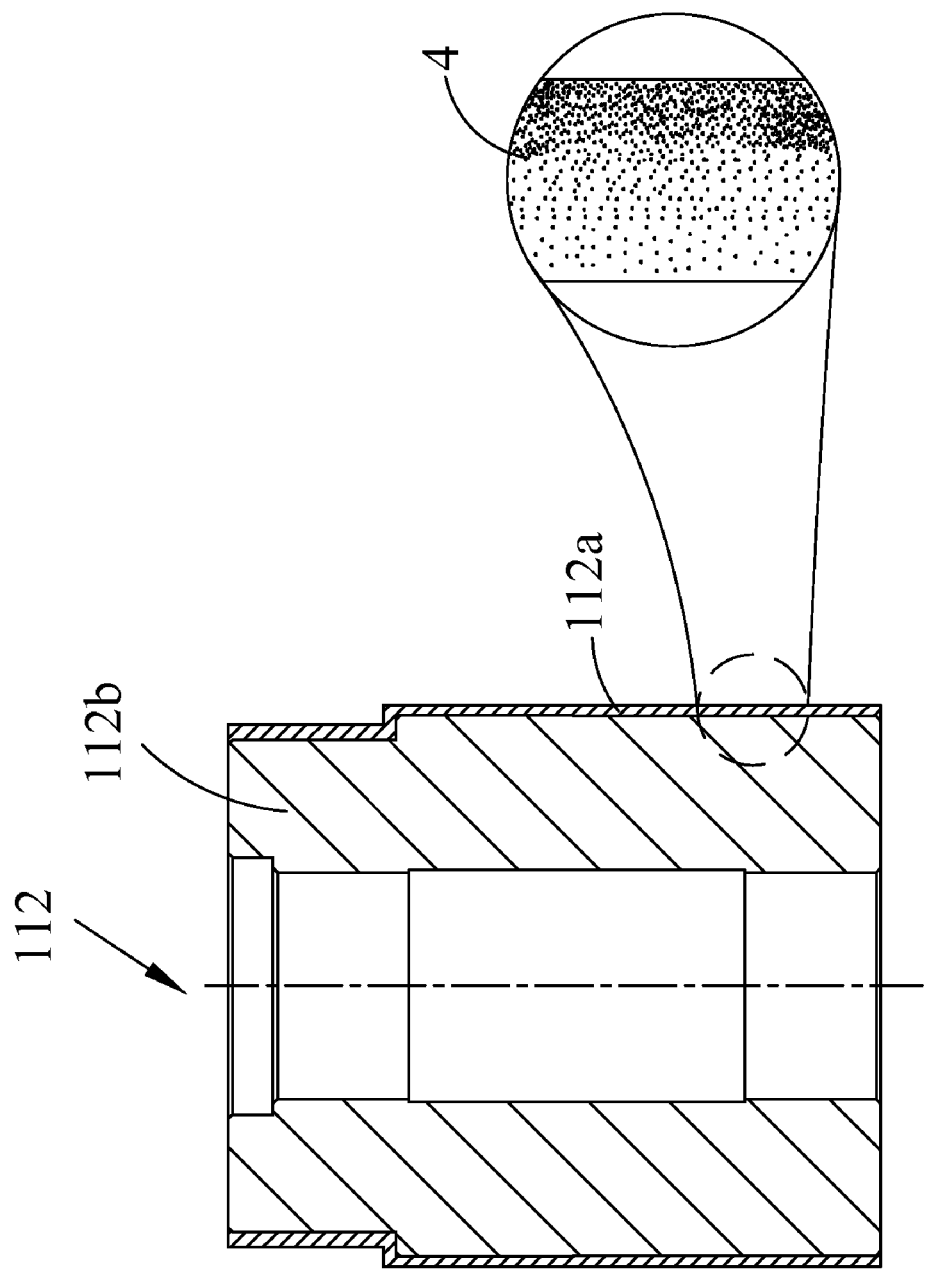
FIG. 3 is a longitudinal sectional view of a rotor core of the alternator of the present invention.

Please refer to FIGS. 1 and 2 that are respectively exploded perspective view and assembled longitudinal sectional view, of an alternator according to the present invention, and to FIG. 3 that is a longitudinal sectional view of a rotor core for the alternator of the present invention. The alternator is driven by an internal combustion engine (not shown), and includes a rotor assembly 11 and a stator assembly 12. The stator assembly 12 is located at the outer side of the alternator and includes silicon steel plates wounded with windings. The rotor assembly 11 is located at the inner side of the stator assembly 12, and includes an armature shaft 111, a rotor core 112, a magnetic pole assembly 113, and a sleeve 114. There is also a bobbin assembly 115 lodged into the rotor assembly 11 and fixed on a rear cover of the alternator.

The armature shaft 111 is inserted in the rotor core 112. The magnetic pole assembly 113 surrounds the rotor core 112 and includes plural sets of magnetic poles that are alternately arranged. Each set of the magnetic poles consists of a first magnetic pole 113a and a second magnetic pole 113b, which are opposite in polarity and alternately arranged in a substantially triangular shape, such that first magnetic poles 113a and the second magnetic poles 113b wedge into each other. The sleeve 114 is covered around the armature shaft 111. The magnetic pole assembly 113 provides a magnetic circuit for magnetizing the rotor core. The magnetic circuit sequentially passes the rotor core 112, the first magnetic poles 113a, the stator assembly 112, the second magnetic poles 113b, and the bobbin assembly 115, and is back to the rotor core 112 again, forming an equivalent magnetic circuit of a closed loop.

The sleeve 114 is covered around one end of the armature shaft 111, allowing the armature shaft 111 to rotate stably. The bobbin assembly 115 consists of windings and a core for generating a magnetic circuit.

The rotor core 112 is a non-homogenous cylindrical sleeve having a first core portion 112a and a second core portion 112b. The first core portion 112a is located at the outer side of the rotor core 112. The rotor core 112 is processed by cementation from the outer surface thereof toward the central line of the rotor core 112 at a predetermined depth, such that the first core portion 112a has carbon weight percentage gradually decreasing from the surface of the first core portion 112a toward the central line of the rotor core 112 till reaching a predetermined carbon weight percentage. In an embodiment of the present invention, the carbon content at the surface of the first core portion 112a is ranging from 0.5% to 1%, and the predetermined carbon weight percentage is ranging from 0.3% to 0.4%. The second core portion 112b is located between an inner side of the rotor core 112 and the first core portion 112a, and has carbon content close to the predetermined carbon weight percentage. More specifically, the carbon content at the surface of the first core portion 112a is higher than the carbon content of the second core portion 112b, and the carbon content of the second core portion 112b is 1.1 to 0.9 times of the predetermined carbon weight percentage. And, the first core portion 112a has hardness value larger than that of the second core portion 112b.

When the alternator is driven to operate and the rotor assembly 11 rotates inside the stator assembly 12, an electromagnetic induction occurs and the stator assembly 12 outputs an electromagnetically induced alternating current.

Since the first core portion 112a has a magnetic property closer to that of a permanent magnet and thereby has relatively high residual magnetism, the alternator, when being driven to operate, can produce sufficient magnetic force between the stator assembly 12 and the rotor assembly 11 at a relatively low rotating speed for the armature shaft 111 to automatically rotate due to the magnetic induction. Thus, the turn-on speed 13 required for the alternator to achieve self-excitation can be reduced.

For example, in an embodiment of the present invention, the carbon content on the surface of the first core portion 112a is about 0.54%, and the of carbon content at a predetermined depth into the first core portion 112a is about 0.35%. That is, the carbon content of the first core portion 112a decreases by 0.01% per 0.1 mm toward into the inner side of first core portion 112a. The carbon content of the first core portion 112a from its surface into different depths thereof are more clearly listed in the following table:

| No. | Carbon content (C %) | At thickness (mm) | |
|---|---|---|---|
| 1 | 0.54 | 25.89 (outer surface) | First core portion 112a |
| 2 | 0.53 | 25.79 | |
| 3 | 0.52 | 25.68 | |
| 4 | 0.51 | 25.53 | |
| 5 | 0.453 | 25.45 | |
| 6 | 0.439 | 25.30 | |
| 7 | 0.426 | 25.23 | |
| 8 | 0.414 | 25.10 | |
| 9 | 0.384 | 25.04 | |
| 10 | 0.365 | 24.95 | |
| 11 | 0.349 | 24.83 | |
| 12 | 0.351 | 24.72 | Second core portion 112b |
| 13 | 0.350 | 24.63 | |
| 14 | 0.353 | 24.58 | |
| 15 | 0.348 | 24.52 | |
| 16 | 0.351 | 24.47 | |
| . | . | . | |
| . | . | . | |
| . | . | . | |

Further, in the alternator of the above illustrated embodiment of the present invention, the rotor core 112 is a non-homogenous carbon steel rotor core and the carbon content at the predetermined depth is about 0.35%. In the following table, the characteristics of the non-homogenous carbon steel rotor core in the above embodiment of the present invention are compared with those of a prior art homogenous carbon steel rotor core having a carbon content of 0.35%:

| | Characteristic comparison | | | |
|---|---|---|---|---|
| | Under cold start condition | | Under warm-up condition | |
| Rotor core | Prior art | Present invention | Prior art | Present invention |
| Maximum output power (W) | 2233 | 2209 | 2034 | 1989 |
| Maximum output current under load (A) | 172.1 | 170.0 | 156.7 | 152.6 |
| Voltage regulator (V) | 14.5 | 14.5 | 14.5 | 14.5 |
| Turn-on speed (Rpms) | 1947 | 1419 | 1635 | 1297 |

| | Maximum output current (A) | | | |
|---|---|---|---|---|
| Different | Under cold start condition | | Under warm-up condition | |
| rotating speeds (Rpm) | Prior art | Present invention | Prior art | Present invention |
| 1600 | 72 | 72 | 64 | 61 |
| 1800 | 94 | 93 | 85 | 83 |
| 2000 | 112 | 110 | 101 | 98 |
| 2500 | 138 | 135 | 125 | 123 |
| 3000 | 150 | 148 | 137 | 134 |
| 4000 | 163 | 161 | 149 | 145 |
| 5000 | 169 | 167 | 154 | 150 |
| 6000 | 172 | 170 | 157 | 153 |

From the above table, the non-homogenous carbon steel rotor core according to the illustrated embodiment of the present invention under the cold start condition has a maximum output power of 2209 W, a maximum output current under load of 170.0 A, a voltage regulator of 14.5V, and a turn-on speed of 1419 RPMs; and the non-homogenous carbon steel rotor core according to the illustrated embodiment of the present invention under the warm-up condition has a maximum output power of 1989 W, a maximum output current under load of 152.6 A, a voltage regulator of 14.5V, and a turn-on speed of 1297 RPMs. On the other hand, the prior art with homogenous carbon steel rotor core under the cold start condition has a maximum output power of 2233 W, a maximum output current under load of 172.1 A, a voltage regulator of 14.5V, and a turn-on speed of 1947 RPMs; and the prior art with homogenous carbon steel rotor core under the warm-up condition has a maximum output power of 2034 W, a maximum output current under load of 156.7 A, a voltage regulator of 14.5V, and a turn-on speed of 1297 RPMs.

Figure 4:
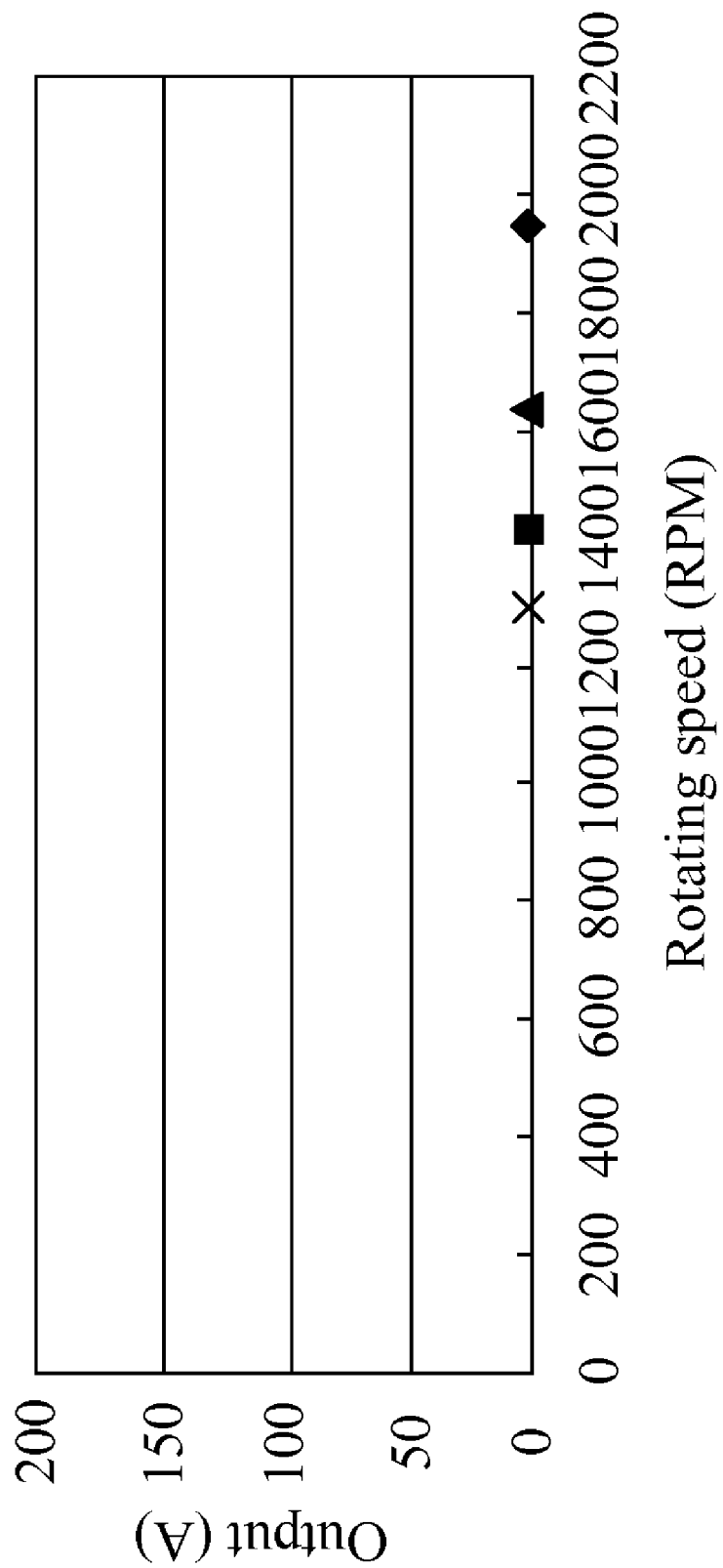
FIG. 4 is a graph showing and comparing the turn-on speeds of the rotor core of an embodiment of the present invention and that of a prior art with the homogenous carbon steel rotor core.

Please refer to FIG. 4 that is a graph showing and comparing the turn-on speeds of the non-homogenous carbon steel rotor core according to the illustrated embodiment of the present invention and the turn-on speeds of the prior art with homogenous carbon steel rotor core having carbon content of 0.35%. As shown, the turn-on speeds of the non-homogenous carbon steel rotor core according to the illustrated embodiment of the present invention under cold start and warm-up conditions are 1400 revolutions per minute (1400 RPM) and 1300 revolutions per minute, respectively. On the other hand, the turn-on speeds of the prior art with homogenous carbon steel rotor core having carbon content of 0.35% under cold start and warm-up conditions are 1950 revolutions per minute and 1630 revolutions per minute, respectively. From the above comparison, it is found the non-homogenous rotor core of the present invention and the prior art with homogenous rotor core, either under the cold start or the warm-up condition, have very close or even the same percentage in terms of the maximum output power, the maximum output current under loaded, and the voltage regulator. However, it is also found the non-homogenous rotor core of the present invention and the prior art with homogenous rotor core, either under the cold start or the warm-up condition, have quite different turn-on speeds. More specifically, the turn-on speed of the non-homogenous rotor core of the present invention under the cold-start condition is about 73% of that of the prior art with homogenous rotor core, and the turn-on speed of the non-homogenous rotor core of the present invention under the warm-up condition is about 79% of that of the prior art homogenous rotor core. In other words, the present invention effectively reduces the turn-on speed of the alternator, allowing the alternator to generate electric power at a low turn-on speed to thereby achieve the object of reducing the power consumption required to turn on the alternator.

Figure 5:
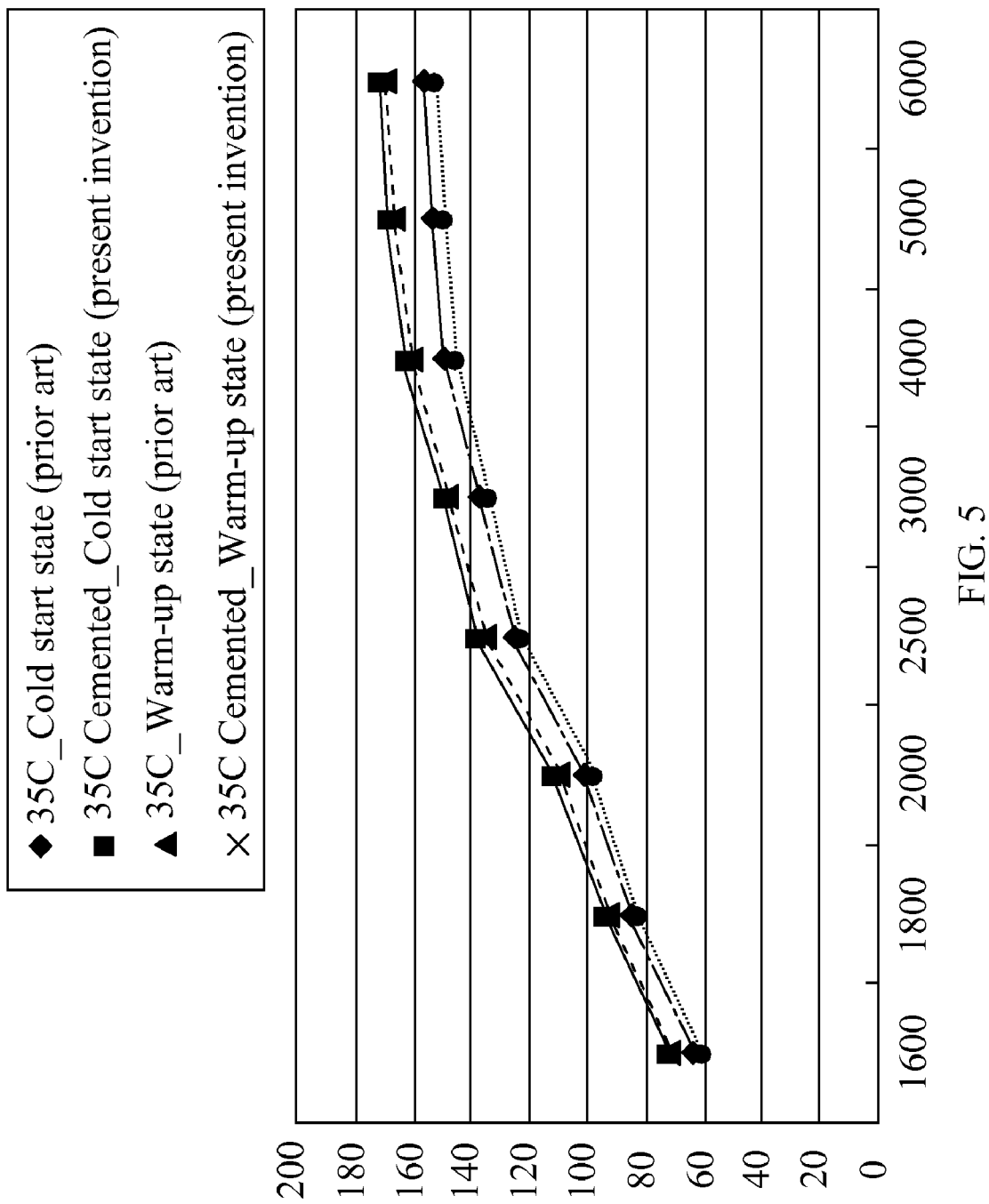
FIG. 5 indicates and compares the output current characteristic curves of the rotor core of an embodiment of the present invention and that of a prior art with the homogenous carbon steel rotor core.

FIG. 5 compares the output current characteristic curves of the rotor core according to the illustrated embodiment of the present invention and that of the prior art with homogenous carbon steel rotor core. More specifically, FIG. 5 shows the output current characteristic curves of the rotor core of the illustrated embodiment of the present invention and the prior art rotor core when they rotate at different rotating speeds between 1600 RPM and 6000 RPM under the cold start and warm-up conditions. From FIG. 5, the output current characteristic curves of the rotor core according to the illustrated embodiment of the present invention and the prior art rotor core are very close to each other. Therefore, the rotor assembly 12 can output current that is very close to what the prior art did while maintaining the required output characteristic, and allow the alternator of the present invention to have stable power generating efficiency.

Further, since the second core portion 112b of the rotor core 112 has a magnetic permeability better than that of the prior art rotor core, the rotor core of the present invention can reduce volume and moment of inertia to thereby save the space for the rotor assembly and accordingly, reduce an overall volume of the alternator.

According to another embodiment of the present invention, the alternator is generally structurally similar to the previously illustrated embodiment but has a first core portion located at the inner side of the rotor core 112 and the first core portion has carbon content that gradually decreases from the surface to a predetermined depth of the first core portion to reach a predetermined carbon weight percentage, and a second core portion located at the outer side of the rotor core 112; and the first core portion has hardness smaller than that of the second core portion. The alternator with above arrangements can achieve the same or similar effects and objects as the alternator in the previous embodiment.

Figure 6:
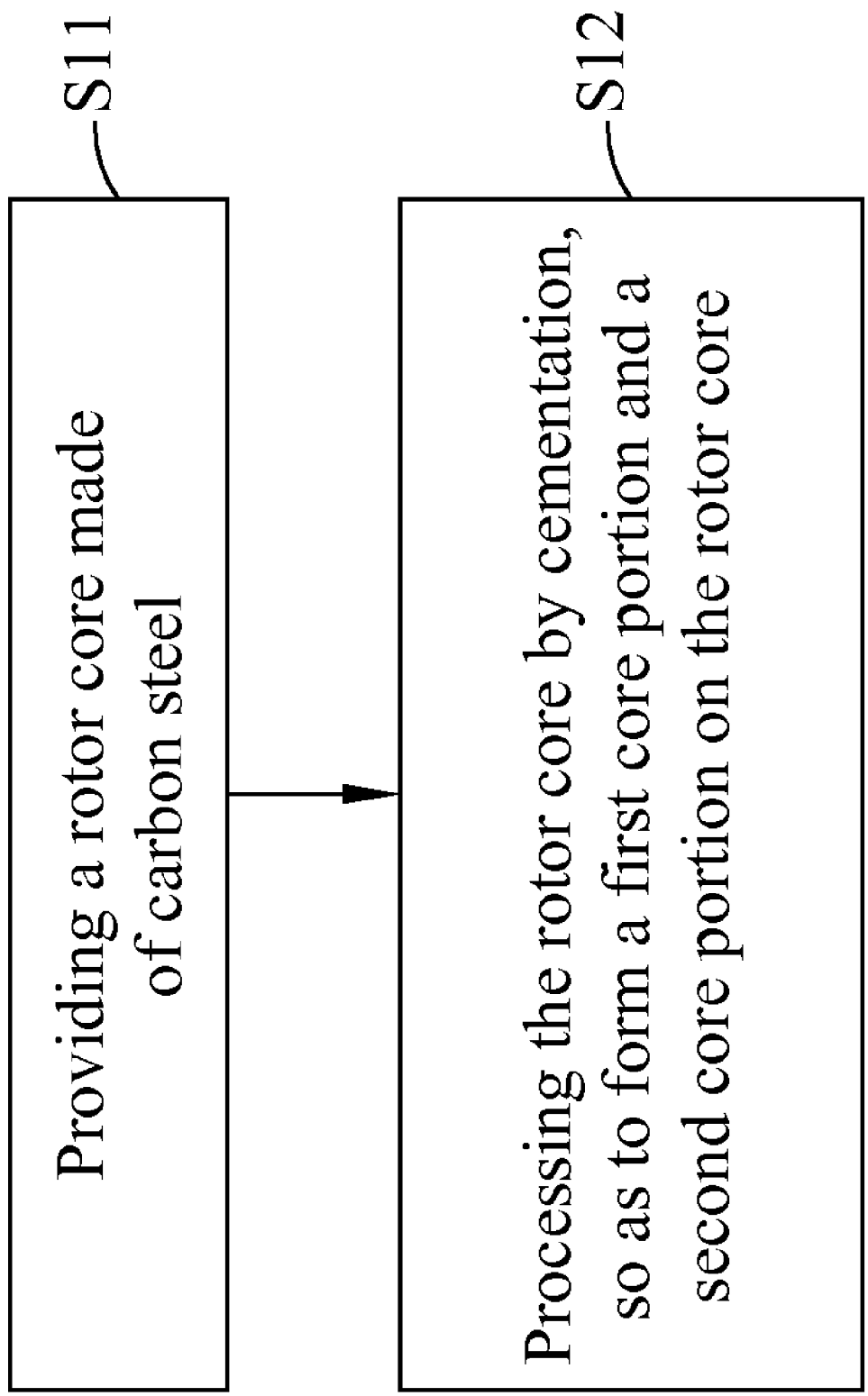
FIG. 6 is a flowchart showing the steps included in a method of manufacturing a non-homogenous rotor core of alternator according to the present invention.
Figure 7:
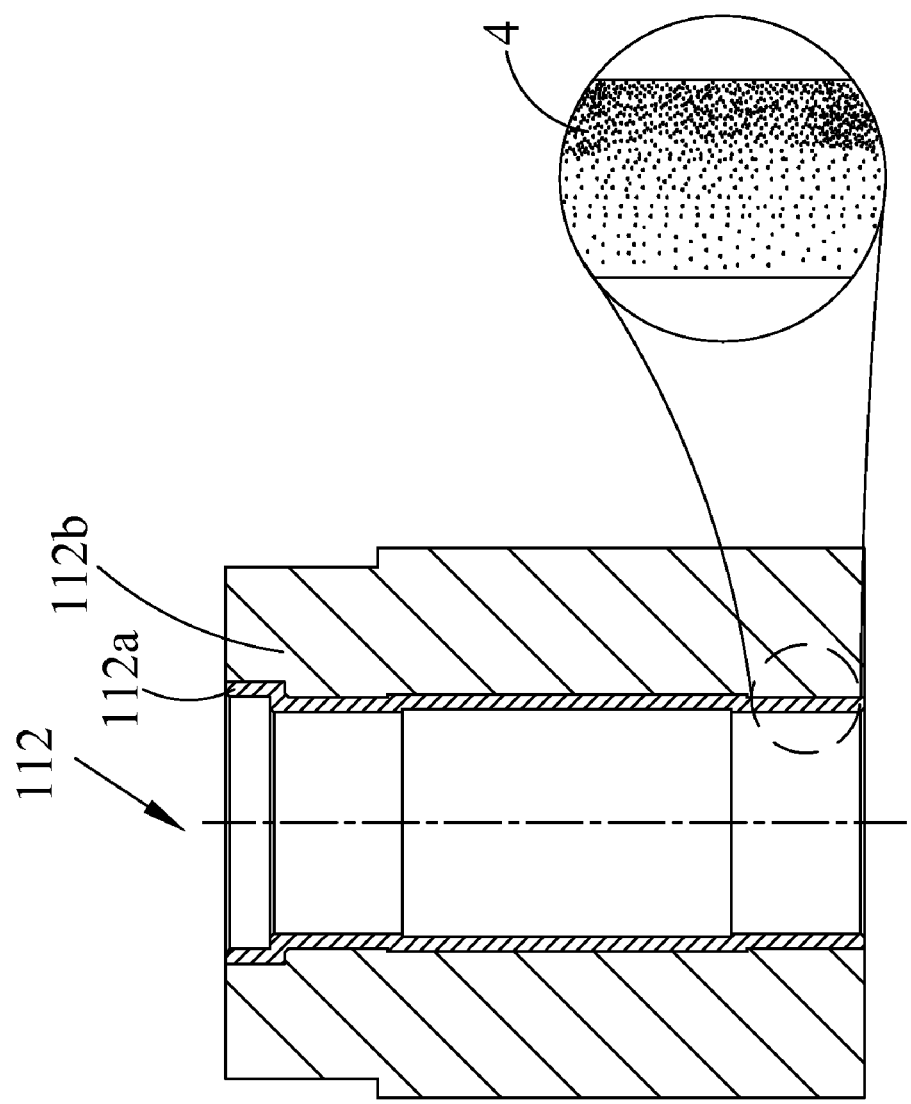
FIG. 7 is a longitudinal sectional view of a rotor core of the alternator of another embodiment of the present invention.

The present invention also provides a method of manufacturing a rotor core 112 of alternator. FIG. 6 is a flowchart showing the steps included in the method of the present invention. As shown, in a first step S11, a rotor core 112 made of carbon steel is provided; and in a second step S12, the rotor core 112 is processed by cementation, so that a first core portion 112a is formed from the outer surface of the rotor core 112 to a predetermined depth and has carbon content that gradually decreases from the surface of the first core portion 112a toward the central line of the rotor core 112 till reaching the predetermined carbon weight percentage. Also, a second core portion is formed between the inner surface of the rotor core 112 to the predetermined carbon weight percentage.

According to the rotor core manufacturing method of the present invention, the carbon weight percentage at the surface of the first core portion is ranging from 0.5% to 1%, and the predetermined carbon weight percentage is ranging from 0.3% and 0.4%; and the carbon content of the second core portion 112b is close to the predetermined carbon weight percentage. Moreover, the second core portion 112b has magnetic permeability higher than that of the first core portion 112a to thereby enhance the output characteristics of the alternator, including the output current or the output voltage; and the first core portion has a relatively high residual magnetism to thereby reduce turn-on speed of the alternator. Further, the first core portion 112a can be processed by a hardened heat treatment to obtain an increased wear resistance.

In brief, a first effect provided by the alternator and the method of manufacturing a rotor core 112 of an alternator according to the present invention is that a first core portion 112a is formed on the outer side of the rotor core of the rotor assembly 12 and a second core portion 112b is formed at the inner side of the first core portion 112a, so that the alternator can reduce turn-on speed and increase output characteristic.

Another effect provided by the alternator and the method of manufacturing a rotor core 112 of an alternator according to the present invention is that the first core portion 112a has higher residual magnetism to reduce rotor core volume and accordingly reduce size and weight of the whole alternator.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. An alternator comprising:
    a stator assembly; and
    a rotor assembly encompassed by said stator assembly, said rotor assembly comprising a rotor core, said rotor core processed by cementation and comprising:
    a first core portion located at the outer side of said rotor core and having carbon content that gradually decreasing from the outer surface of said first core portion toward the central line of said rotor core till reaching a predetermined carbon weight percentage; and
    a second core portion encompassed by said first core portion and having carbon content close to the predetermined carbon content.

2. The alternator as claimed in claim 1, wherein said carbon content at the surface of the first core portion is ranging from 0.5% to 1%.

3. The alternator as claimed in claim 2, wherein said predetermined carbon weight percentage is ranging from 0.3% to 0.4%.

4. The alternator as claimed in claim 3, wherein said carbon content of the second core portion is 1.1 to 0.9 times as much as the predetermined carbon weight percentage.

5. The alternator as claimed in claim 1, wherein said second core portion has higher hardness than said first core portion thereof.

6. The alternator as claimed in claim 1, wherein said rotor assembly further comprises:
    an armature shaft inserted in said rotor core; and
    a sleeve lodged on one end of said armature shaft.

7. An alternator, comprising:

a stator assembly; and a rotor assembly encompassed by said stator assembly and comprising a rotor core, said rotor core comprising a first core portion located at the inner side of said rotor core and having carbon content gradually decreasing from the outer surface of said first core portion toward the central line of said rotor core till reaching a predetermined carbon weight percentage; and a second core portion surrounding said first core portion and located at the outer side of said rotor core.

8. The alternator as claimed in claim 7, wherein said carbon content at the surface of the first core portion is ranging from 0.5% to 1%.

9. The alternator as claimed in claim 8, wherein said predetermined carbon weight percentage is ranging from 0.3% to 0.4%.

10. The alternator as claimed in claim 9, wherein said carbon content of the second core portion is 1.1 to 0.9 times as much as the predetermined carbon weight percentage.

11. The alternator as claimed in claim 7, wherein said first core portion has higher hardness than said second core portion thereof.

12. The alternator as claimed in claim 7, wherein said rotor assembly further comprises:

an armature shaft inserted in said rotor core; and a sleeve lodged on one end of said armature shaft.

* * * * *